(12) United States Patent
Plasek

(10) Patent No.: US 6,289,283 B1
(45) Date of Patent: Sep. 11, 2001

(54) DOWNHOLE TOOL DATA CORRECTION METHOD AND APPARATUS

(75) Inventor: Ronald E. Plasek, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/487,061

(22) Filed: Jan. 19, 2000

Related U.S. Application Data (60) Provisional application No. 60/120,981, filed on Feb. 19, 1999.

(51) Int. Cl.$^7$ .................................................. G01V 5/04
(52) U.S. Cl. ................................................................ 702/8
(58) Field of Search .................................. 702/8; 703/10; 250/262, 256, 261, 260, 252.1, 269.3, 269.7, 269.8, 269.6

(56) References Cited

U.S. PATENT DOCUMENTS

| | | |
|---|---|---|
| 3,521,064 | 7/1970 | Moran et al. . |
| 4,390,783 * | 6/1983 | Grau .................................. 250/269.8 |
| 4,394,574 * | 7/1983 | Grau et al. ........................... 250/262 |
| 4,464,569 * | 8/1984 | Flaum ................................. 250/269.6 |
| 4,585,939 * | 4/1986 | Arnold et al. ........................ 250/256 |
| 4,937,446 | 6/1990 | McKeon et al. . |
| 5,120,955 * | 6/1992 | Galford ................................ 250/256 |
| 5,369,578 | 11/1994 | Roscoe et al. . |
| 5,461,230 * | 10/1995 | Winemiller .......................... 250/261 |

FOREIGN PATENT DOCUMENTS 2 056 060 A  3/1981  (GB) .

* cited by examiner

Primary Examiner—Donald E. McElheny, Jr.
(74) Attorney, Agent, or Firm—John J. Ryberg; Victor H. Segura (57) ABSTRACT

A method and apparatus are provided for correcting gamma ray data representative of gamma ray energies for spectral degradation. The method and apparatus include degrading reference gamma ray spectra. At least one correction factor is calculated between the degraded gamma ray spectra and the reference gamma ray spectra. The gamma ray data are then corrected using a calculated correction factor. Another method is provided for determining a correction factor for correcting data representative of gamma ray energies for spectral degradation. The method includes disposing a downhole tool in a simulated environment representative of actual downhole conditions, the tool including a neutron source and at least one gamma ray detector. The temperature of at least one of the gamma ray detectors of the tool is then varied while the simulated environment is irradiated with neutrons emitted from the neutron source. Gamma ray energy signals are then detected at the at least one detector in response to gamma rays produced during nuclear reactions between the neutrons and materials in and of the simulated environment. A characteristic of the simulated environment is then determined along with a characteristic of the at least one detector. The determined characteristics of the simulated environment and of the at least one detector are then correlated to determine at least one correction factor.

44 Claims, 5 Drawing Sheets

DOWNHOLE TOOL DATA CORRECTION METHOD AND APPARATUS

CROSS-REFERENCES

This present application claims the benefit of U.S. Provisional Application No. 60/120,981 filed Feb. 19, 1999.

BACKGROUND OF THE INVENTION

1. Field of the Invention

This invention relates generally to investigation of subsurface earth formations, and, more particularly, to a method for correcting data obtained by a downhole tool for anomalies that may be caused by factors including environmental characteristics and/or intrinsic tool parameters. The invention has general application in the well logging art, but is particularly useful at a well site while logging.

2. Description of Related Art

A major goal of well logging is to maximize the amount of hydrocarbons recovered from an earth formation. By continuously monitoring oil saturation in the earth formation, secondary and tertiary techniques may be employed to enhance recovery of hydrocarbons. Oil saturation is usually expressed as a percentage by volume of oil in the pore space. Different methods have been developed for monitoring oil saturation during production of a well.

One method for monitoring oil saturation is based on the fact that hydrocarbons contain carbon and water contains oxygen. A carbon/oxygen ratio ("COR") is used to compute oil saturation. The COR may be derived by applying a spectral fitting technique to an inelastic gamma ray spectrum to compute carbon, oxygen, and other elements present in the formation. This approach provides one means for computing the COR.

Alternatively, the COR may be derived using counts from broad energy regions "windows" in the inelastic gamma ray spectrum across the region of the predominant carbon and oxygen gamma ray energies. The COR is derived by taking the ratio of the counting-rates in two energy windows of the inelastic gamma ray spectrum. Such measurements will be referred to herein as "windows COR value" measurements.

All gamma rays in these windows do not result solely from the elements carbon (C) and oxygen (O). Nevertheless, this count-rate windows COR value will respond to changes in oil saturation in the formation, provided the other formation and borehole properties remain constant. The conversion between the windows COR value and the oil-saturation value is typically determined by making many measurements with one tool (called the "database" or "characterization" tool) at standard conditions in laboratory simulated formations having accurately known porosity, lithology, completion geometry, and saturation. This database set of measurements is commonly known as the "tool characterization." The tool characterization may also be derived by theoretical modeling techniques as known in the art.

Gamma ray photon energies are detected downhole with the use of conventional downhole tools, also known as spectrometers, such as those disclosed in U.S. Pat. No. 4,937,446 to McKeon et al. (assigned to the present assignee). The '446 patent is hereby incorporated in its entirety by reference herein. The '446 patent discloses a downhole tool for determining hydrocarbon or fluid saturations within a formation adjacent a well bore. One or more gamma ray detectors on the downhole tool measure gamma ray photons produced from carbon and oxygen during the neutron burst as a result of neutron inelastic scattering from the nuclei of carbon and oxygen present in the formation and the borehole. Analyzing the inelastically produced gamma ray photon energy spectrum for the characteristic energy gamma ray photons from atomic elements such as carbon (C), oxygen (O), silicon (Si), calcium (Ca), iron (Fe), and the like, allows the presence of these elements, and their relative abundance, in the formation and borehole regions, to be quantified.

When the formation water salinity is known and is higher than about 20000 parts per million (20 kppm) sodium chloride (NaCl), a different pulsed-neutron technique may be used to measure the rate of capture of thermal neutrons. This quantity, known as the thermal-neutron capture cross-section (Sigma), is strongly influenced by the affinity of chlorine (Cl), a primary constituent of saltwater, to absorb thermal neutrons. Conventional pulsed-neutron tools measure Sigma by measuring the counting rate of gamma ray photons produced by thermal neutron capture after a pulse of neutrons has been released into the formation.

Figure 1:
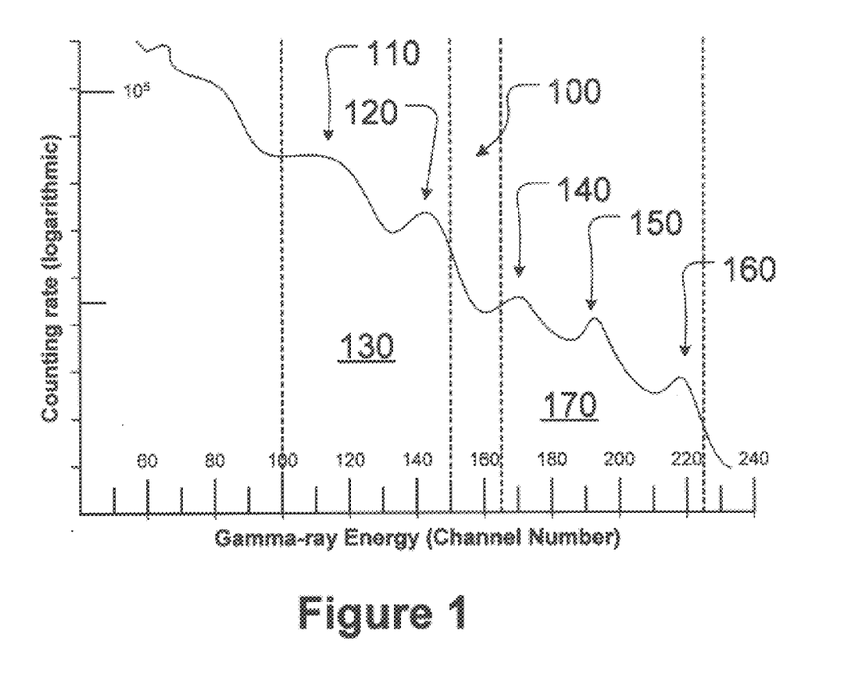
FIG. 1 schematically illustrates a typical laboratory formation inelastic gamma ray spectrum, containing carbon peaks in a carbon window region, and oxygen peaks in an oxygen window region.

FIG. 1 shows a typical laboratory formation inelastic gamma ray spectrum 100, containing carbon peaks 110 and 120, in the carbon window region 130, and oxygen peaks 140, 150 and 160, in the oxygen window region 170. The gamma ray energies (corresponding to channel numbers) are plotted along the horizontal axis, and the detector counting rates are plotted on a logarithmic scale along the vertical axis.

Figure 2:
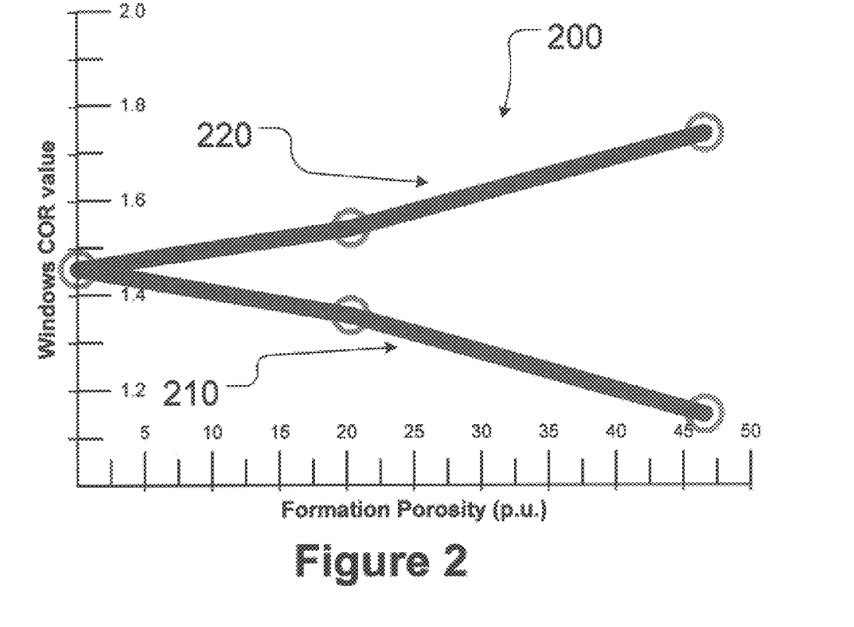
FIG. 2 schematically illustrates a typical windows COR value response-graph (a characterization in a specific formation and completion geometry) plotted against porosity and formation oil-saturation.

FIG. 2 shows a typical windows COR value response-graph 200 (a characterization in a specific formation and completion geometry) plotted against porosity and formation oil-saturation. The formation porosity (in percentage units, p.u., the percentage by volume of the formation that is filled with fluids such as air, gas or liquid) is plotted along the horizontal axis, and the windows COR value (dimensionless ratio of respective counts) is plotted along the vertical axis. Clearly, for any given porosity, there is a COR-based formation oil response bounded by the water-saturated line 210 (on the bottom) and the oil-saturated line 220 (on the top). This windows COR value response-graph 200 is commonly referred to as the "windows COR value fan chart" and forms the basis for windows COR value interpretation.

Figure 3:
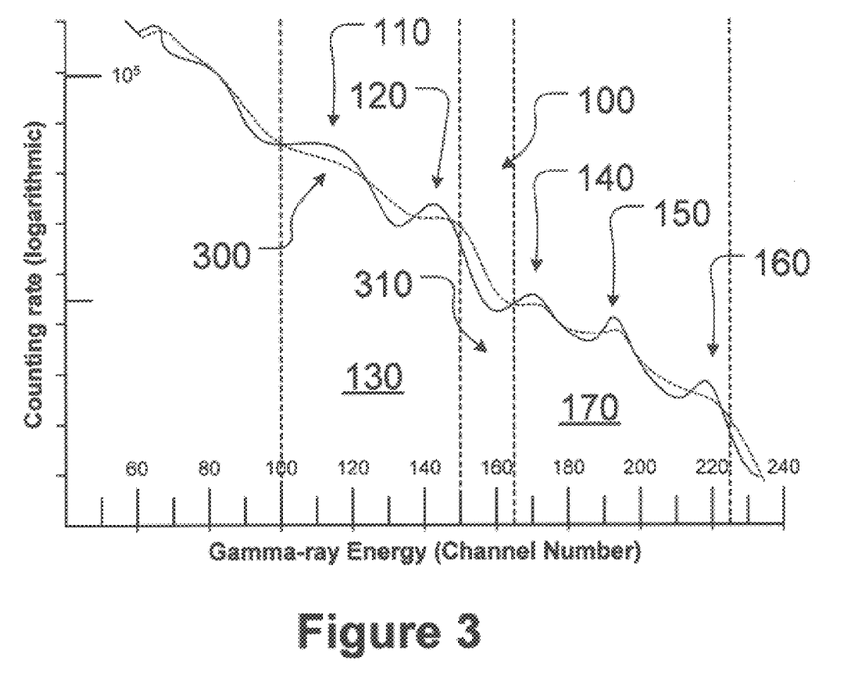
FIG. 3 schematically illustrates the effects of temperature on a sample laboratory formation inelastic spectrum.

Detectors in downhole tools used to obtain the data to calculate the windows COR value typically use scintillation crystals, such as thallium-activated sodium iodide (NaI), thallium-activated or sodium-activated cesium iodide, bismuth germanate (BGO), gadolinium oxyorthosilicate doped with cerium (GSO), and the like. These scintillation detectors typically all have the undesirable characteristic of losing pulse-height resolution with increasing temperature, resulting in spectral degradation. This means that spectral peaks that are relatively "sharp" and well defined at room temperature will generally degrade (broaden) when the detector gets hot. For example, FIG. 3 shows the effects of temperature on a sample laboratory formation inelastic spectrum 300 (shown in phantom) superimposed on the typical laboratory formation inelastic gamma ray spectrum 100, as shown in FIG. 1.

In addition, not all gamma ray detectors will have the same inherent or so-called "intrinsic" resolution even at room temperature. As a scintillation detector heats up, the detector resolution typically worsens and the carbon and oxygen peaks broaden, resulting in a net "spillover" or loss of counts from both the carbon and oxygen windows. For example, in FIG. 3, note the increase of count-rate in an intermediate region 310 between the oxygen window 130 and the carbon window 170, as counts from both the nearby oxygen peak 140 and the carbon peak 120 "spill over" into this intermediate region 310. Unfortunately, the carbon window 130 and oxygen window 170 count-rates do not both change by the same percentage, and this results in a net bias in the windows COR value. Typically, the windows COR value generally tends to increase with worsening resolution.

In summary, the measured windows COR value of a given tool will generally vary with temperature, all other parameters of the formation and borehole remaining constant. Consequently, the measured windows COR value of a given tool will generally give an erroneous oil-saturation reading when hot. In addition, a tool having a worse intrinsic resolution than the tool used in the laboratory or database characterizations will also give an erroneous oil-saturation reading, even at room temperature.

Figure 4:
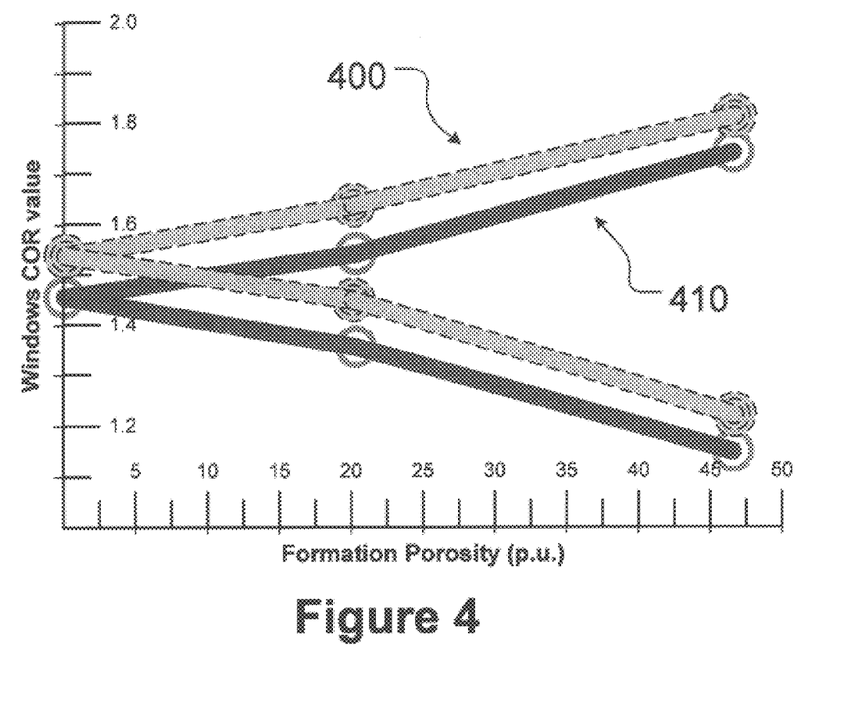
FIG. 4 schematically illustrates, using laboratory formation data, how resolution degradation can affect the windows COR value readings.

FIG. 4 shows, using laboratory formation data, for example, how resolution degradation can affect the windows COR value readings. Note that the effect of resolution degradation, moves the points on a degraded fan curve 400 (outlined in phantom) characterization, considerably off a correct tool fan curve 410 characterization, moving the degraded fan curve 400 characterization to a position generally above the correct tool fan curve 410 characterization Consequently, resolution degradation can result in an incorrect saturation reading. In this typical reservoir-like condition, it is clear that oil-saturation estimates can be in error by up to 10 or 20 s.u. or even more, depending on porosity. This error is due solely to detector resolution degradation, since all other formation/borehole parameters were held constant.

The present invention is directed to overcoming, or at least reducing the effects of, one or more of the problems set forth above.

SUMMARY OF THE INVENTION

In one aspect of the invention, a method is provided for correcting gamma ray data representative of gamma ray energies for spectral degradation. The method including degrading reference gamma ray spectra; calculating at least one correction factor between the degraded gamma ray spectra and the reference gamma ray spectra; and correcting the gamma ray data using at least one calculated correction factor.

In another aspect of the invention, a method is provided for determining a correction factor for correcting data representative of gamma ray energies for spectral degradation. The method including disposing a downhole tool in a simulated environment representative of actual downhole conditions, the tool including a neutron source and at least one gamma ray detector; varying the temperature of at least one gamma ray detector of the downhole tool; irradiating the simulated environment with neutrons emitted from the neutron source; detecting gamma ray energy signals at the at least one detector in response to gamma rays produced during nuclear reactions between the neutrons and materials in and of the simulated environment; determining a characteristic of the simulated environment; determining a characteristic of the at least one detector; and correlating the determined characteristic of the simulated environment with the determined characteristic of the at least one detector to determine at least one correction factor.

In another aspect of the invention, a computer-readable, program storage device is provided, encoded with instructions that, when executed by a computer, perform a method including degrading reference gamma ray spectra; calculating at least one correction factor between the degraded gamma ray spectra and the reference gamma ray spectra; and correcting gamma ray data representative of gamma ray energies for spectral degradation using at least one calculated correction factor.

In yet another aspect of the present invention, a computer programmed to perform a method is provided, the method including degrading reference gamma ray spectra; calculating at least one correction factor between the degraded gamma ray spectra and the reference gamma ray spectra; and correcting gamma ray data representative of gamma ray energies for spectral degradation using at least one calculated correction factor.

BRIEF DESCRIPTION OF THE DRAWINGS

Other aspects and advantages of the invention will become apparent upon reading the following detailed description and upon reference to the drawings in which.

DETAILED DESCRIPTION OF SPECIFIC EMBODIMENTS

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

The data correction techniques disclosed herein are applicable to gamma ray data, obtained with conventional downhole tools, such as those disclosed in the referenced '446 patent. Generally, these types of downhole tools are used for evaluating cased borehole formations to determine the remaining hydrocarbon saturation in the formation, with the capability of providing additional measurements of the fluid phases within the borehole.

Figure 5:
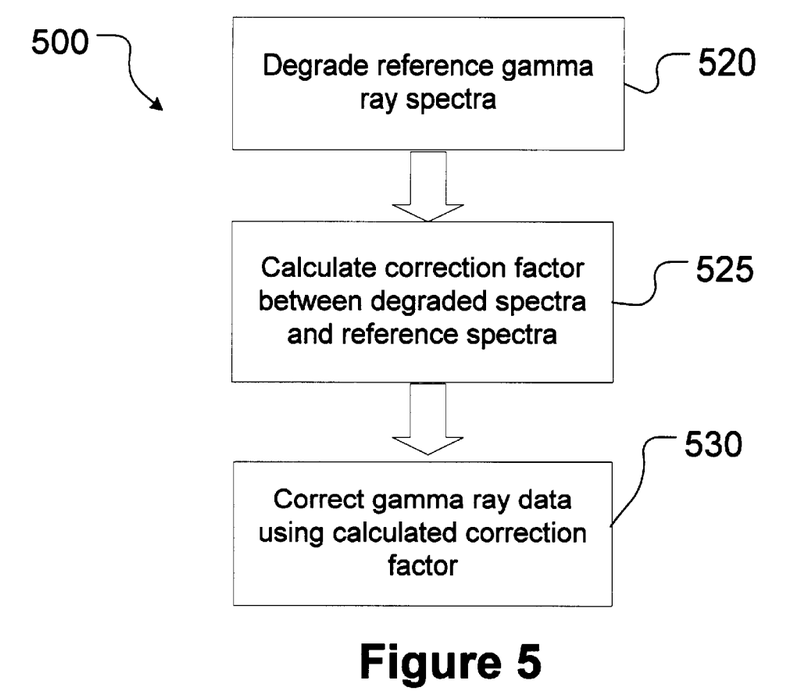
FIG. 5 schematically illustrates a method of correcting gamma ray data practiced in accordance with the present invention.
Figure 6:
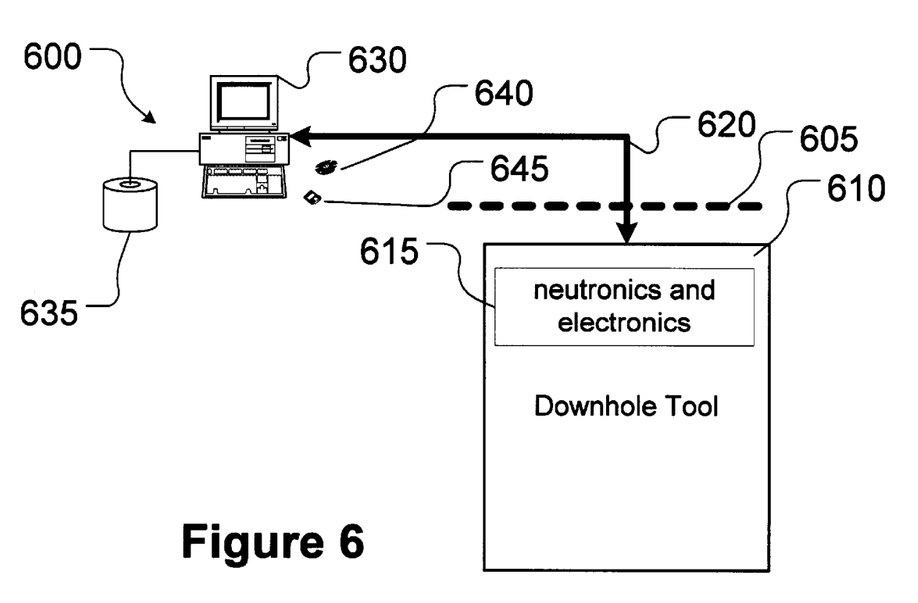
FIG. 6 schematically illustrates a well-logging system using method of correcting a window ratio value in accordance with the present invention.

FIG. 5 illustrates one particular embodiment of a method 500 practiced in accordance with the present invention. FIG. 6 illustrates one particular apparatus 600 with which the method 500 may be practiced. For the sake of clarity, and to further an understanding of the invention, the method 500 shall be disclosed in the context of the apparatus 600. However, the invention is not so limited and admits wide variation, as is discussed further herein.

Referring now to both FIGS. 5 and 6, a downhole tool 610 is used during well logging in a borehole (not shown) below a surface 605. The downhole tool 610 has, among other things;, a set of neutronics and electronics 615 that may include a fast neutron source (not shown), at least one gamma ray photon detector (not shown), a controller (not shown) and a communications capability (not shown). The neutron source in the set of neutronics and electronics 615 generates fast neutrons (having kinetic energies of about 14 MeV) during well-logging that scatter inelastically off of atomic nuclei in the materials surrounding the downhole tool 610. Inelastic gamma ray photons generated by inelastic collisions of the fast neutrons with the atomic nuclei in the materials surrounding the downhole tool 610 may be detected in the one or more gamma ray photon detectors in the set of neutronics and electronics 615.

The controller in the set of neutronics and electronics 615 controls the neutron source and the one or more gamma ray photon detectors. The communicator in the set of neutronics and electronics 615 communicates via a line 620 (such as a two-way data link) with a computer system 630. The communicator in the set of neutronics and electronics 615 may receive instructions from the computer system 630. The communicator in the set of neutronics and electronics 615 may also send to the computer system 630 collected data representative of gamma ray photon energies detected in the one or more gamma ray photon detectors in the set of neutronics and electronics 615 during the well-logging.

The method 500 begins, as set forth in box 520, by successively degrading a set of characterization or reference gamma ray spectra using a suitable algorithm. The reference spectra may be based on laboratory simulation, as described above, or derived by theoretical modeling. Various parameters may be considered in the theoretical model or simulation, including temperature, formation lithology, source-to-detector(s) spacing, borehole conditions, and detector properties. The reference gamma ray spectra may comprise inelastic and/or thermal gamma ray energies. The spectra are degraded by incremental amounts over the range of degradation typically encountered in well logging as known in the art. The degradation algorithm may include parameters for energy dependencies of the particular gamma ray detector(s) used in the neutronics and electronics 615 of the downhole tool 610. As the reference gamma ray spectra are being degraded, the resulting windows COR values are computed.

At step 525, correction factors are calculated between the degraded gamma ray spectra and the reference gamma ray spectra. The correction factors may be calculated by determining the deviation between the two spectra and tabulating the points to derive an algorithm by point fitting techniques using different mathematical algorithms as known in the art. Different correction factor algorithms may be derived for different downhole tool 610 configurations, depending on the number and location of the gamma ray detector(s). Different correction factor algorithms may also be derived for sandstone (largely silicon dioxide-containing) and limestone (largely calcium carbonate-containing) lithology formations, as well as for open-hole and cased-hole completions.

At step 530, the gamma ray data representative of gamma ray energies, obtained or measured with the downhole tool 610, are corrected for spectral or detector resolution degradation. As described above, the neutronics and electronics 615 of the downhole tool 610 are used to generate fast neutrons and to collect data representative of the detected inelastic and/or thermal gamma ray photon energies during the well-logging. Though the techniques of the present invention are suited for real-time implementation (e.g., while drilling the borehole), the present invention is not so limited. Data representative of gamma ray energies may be stored downhole in tool 610 memory (not shown) for processing at the surface as known in the art.

The calculating step 525 and the correcting step 530 include the determination of first and second windows (or window regions) within the gamma ray spectra. Windows similar to the carbon window region 130 and the oxygen window region 170 of FIG. 3 are determined. The first and second windows (or window regions) may have respective first and second window values representative of detector counts in the first and second windows, respectively. A windows ratio value (for example, the windows COR value described above) may be formed by dividing the first window value by the second window value. For example, an uncorrected windows COR value for the degraded inelastic gamma ray spectrum 300 (shown in phantom), as shown in FIG. 3, may be formed by dividing the carbon counts in the carbon window region 130 by the oxygen counts in the oxygen window region 170.

The method 500 proceeds as set forth in box 530 by determining the amount of spectral degradation of the measured gamma ray data relative to the reference gamma ray spectra data. In real-time application, the amount of spectral degradation of the measured gamma ray data is known because full n-channel spectra (e.g., 256-channel spectra, such as the inelastic gamma ray photon spectrum 300, as shown in FIG. 3) may be recorded, fitted, and analyzed to the reference gamma ray spectra. Spectral fitting techniques are described in U.S. Pat. No. 5,369,578 to Roscoe et al. and U.S. Pat. No. 3,521,064 to Moran et al. (both assigned to the present assignee). A non-linear solver may be used to record and process (e.g., using a Marquardt variety procedure) a 10-or-more minute spectral accumulation of gamma ray energy data from the downhole tool 610. However, the present invention is not limited in applicability to the use of spectral fitting techniques. Then, using a degradation-based correction algorithm described above, the correction factor that needs to be applied to the measured windows COR value may readily be computed.

Figure 7:
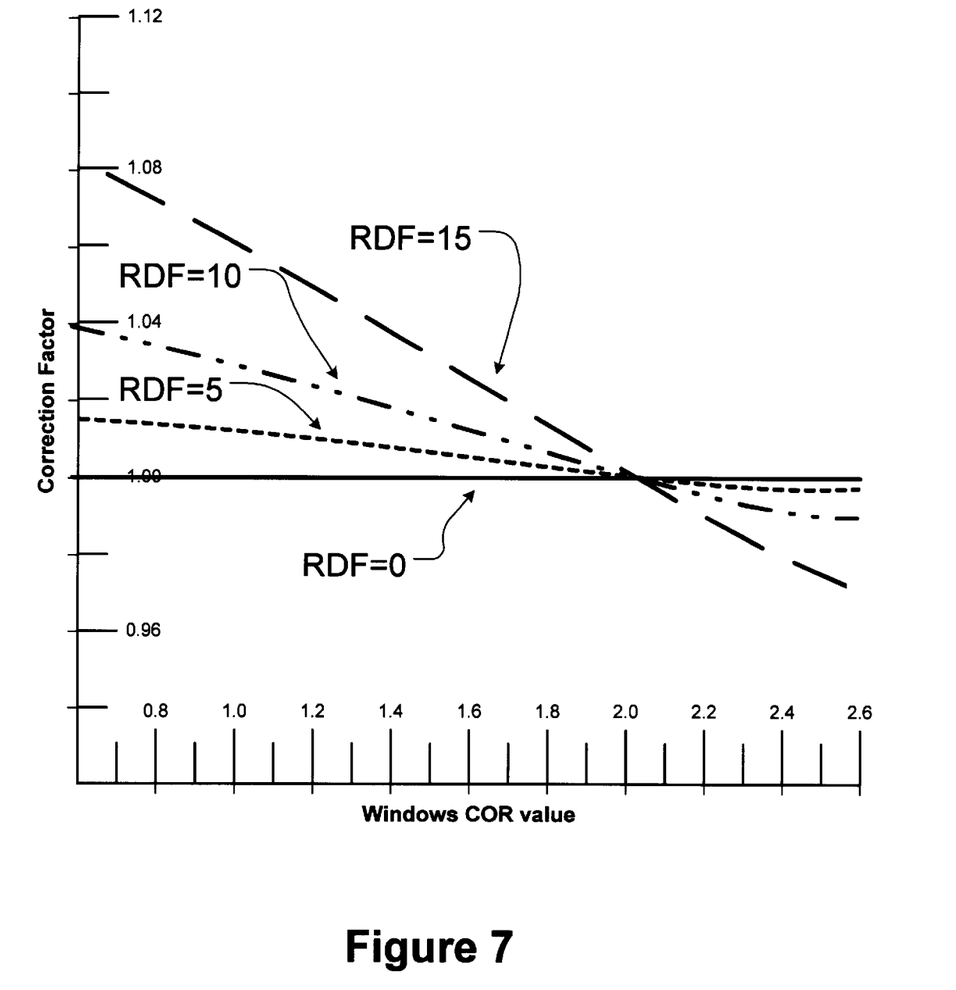
FIG. 7 shows a typical set of windows COR value correction factors plotted against measured windows COR values for several different amounts of a resolution degradation factor (RDF): RDF=0 (no degradation), RDF=5, RDF=10, and RDF=15.

FIG. 7 shows a typical set of windows COR value correction factors plotted against measured windows COR values for several different amounts of a resolution degradation factor (RDF): RDF=0 (no degradation), RDF=5, RDF=10, and RDF=15. Other correction curves for intermediate RDF values (RDF=4,3,2,1) may be derived, which, if shown in FIG. 7, would degenerate to a straight line with a correction value of 1.0 (no correction) for RDF=0.

It is obviously not practical to construct laboratory formations to duplicate all environments encountered in logging, with pressurized gas-bearing formations and exotic mineral mixtures being good examples. Thus, another embodiment of the invention may be implemented by theoretically modeling the reference gamma ray spectra (representative of downhole tool pulse-height spectra) using computer models such as Monte Carlo mathematical modeling. Correction factors may then be derived by degrading the modeled spectra over a range of degradation conditions and using the simulated detector responses to calculate the correction factors as described above.

Figure 8:
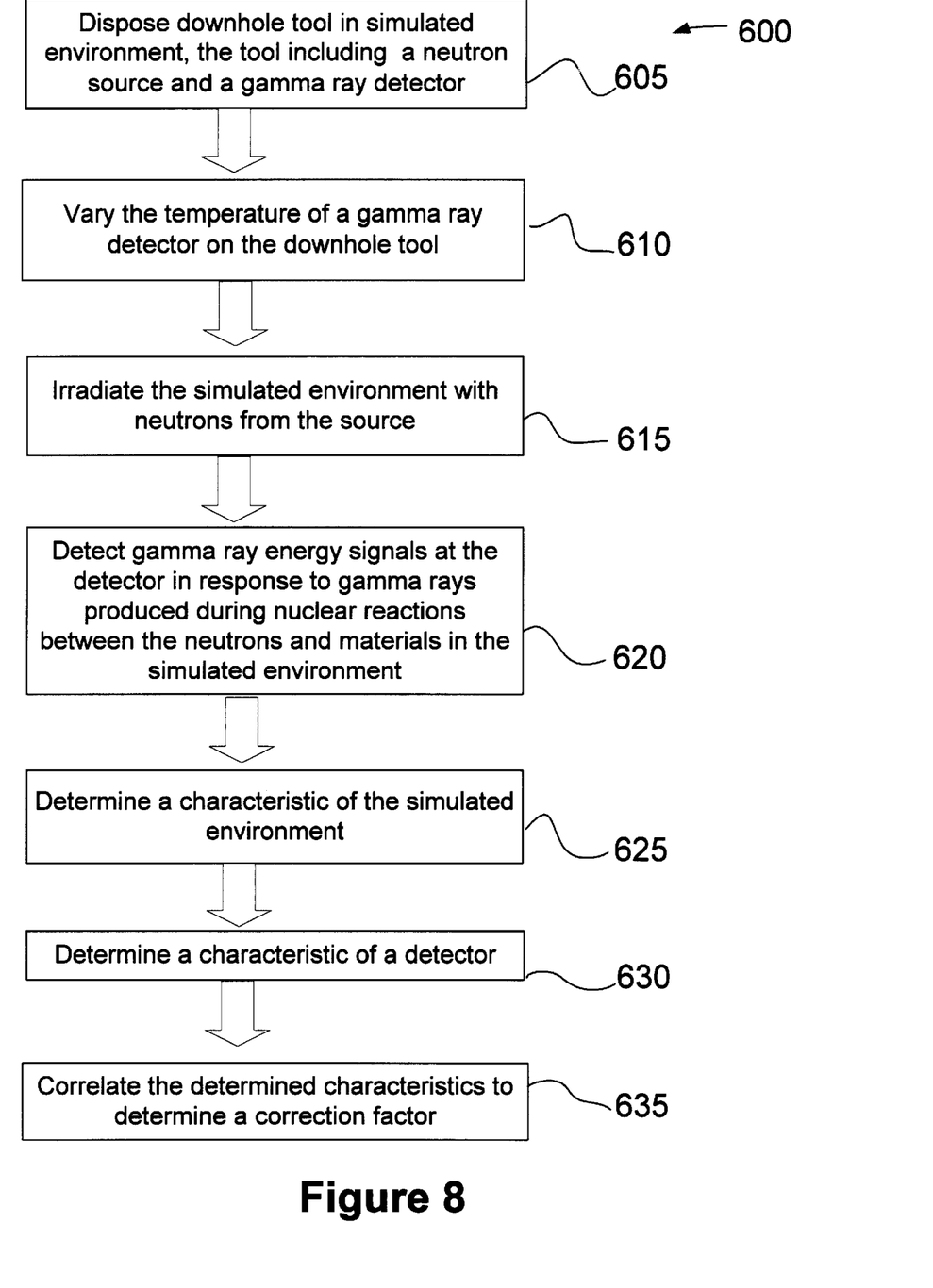
FIG. 8 schematically illustrates a method of determining a correction factor for correcting gamma ray data in accordance with the present invention.

FIG. 8 illustrates another embodiment of a method 600 practiced in accordance with the present invention. This method 600 may be implemented to correct the windows COR value., obtained with systems where full-spectrum analysis is not feasible (such as in many older logging systems in the industry). The method begins at box 605 by disposing a downhole tool (characterization tool) in a simulated formation/borehole environment representative of actual downhole logging conditions. Since downhole temperatures can be very extreme, the temperature of at least one detector (and borehole) of the characterization tool is varied at box 610. The detector may be heated in successive stages within the simulated environment. Alternatively, the temperature may also be varied by heating the tool prior to disposing it in the environment and cooling it successively.

At box 615, the simulated environment is irradiated during the temperature cycle with neutrons emitted from the neutron source. At box 620, the gamma ray energy signals produced by the nuclear reactions between the neutrons and the simulated environment are detected at the detector(s). At box 625, a characteristic (COR measurement) of the simulated environment is determined as described above (which will change with temperature due to detector resolution degradation). At box 630, the characteristic detector resolution is determined. The detector resolution may be determined by placing an isotopic source near or adjacent to the detector as the temperature is varied. The neutron source is preferably turned-off when the detector resolution is being determined. The isotopic source may be inserted or placed within simulated environment in any suitable method. Alternatively, the downhole tool may also be withdrawn from the simulated environment to be fitted with the isotopic source and re-inserted into the simulated environment. Typical isotopic sources used in the industry to measure detector resolution are cesium137 ($^{137}Cs$) and cobalt60 ($^{60}Co$).

At box 635, a relationship or correlation between the COR value correction needed and detector resolution for the database characterization tool is derived. A function may then be determined, expressed in the form of a formula, a look-up table, a relational database, and the like, relating the measured detector resolution degradation to the range of known gamma ray energies. With this technique, if one knows the detector resolution of the characterization tool (or any other tool, for that matter) at any given time, one knows the COR correction needed for the logging environment.

This method 600 of the invention is also applicable when manufacturing any given downhole tool. The appropriate correction profile for the given tool can be derived as described above (i.e., detector resolution vs. detector temperature profile). The correction profile could be, stored in a memory storage in the tool itself or in any suitable storage as known in the art. The tool detector resolution would then be easily determined at any given depth (temperature) since the downhole tool temperature is typically available while logging. Then using the characterization tool correlation between the detector resolution and COR correction factor, one could correct the windows COR for any given tool. This embodiment of the invention does not require acquisition of the full spectrum or analysis of the full spectrum to obtain the desired data correction.

Although the embodiments of the present invention have been disclosed using the example of the windows carbon/oxygen ratio, the invention is not limited to any particular type of "window" or "windows ratio." There are other windows and corresponding windows ratios in use in well logging applications that suffer the same type of effects due to resolution degradation. One such windows ratio is the so-called "silicon-to-calcium windows ratio" (a sand/lime lithology indicator). Akin to the carbon and oxygen windows, the "silicon" window is positioned to overlap one or more spectral peaks due to the element silicon. Similarly, the "calcium" window overlaps prominent calcium spectral peaks.

The computer system 630 in FIG. 6 may be programmed to execute any of the above-described embodiments of a method according to the present invention. The manner in which this programming and execution occurs will be implementation specific.

In the embodiment of FIG. 6, a database 635 may store a plurality of correction factors that might potentially be applied, depending upon which spectral degradation factors are determined. This particular embodiment, therefore, requires some a priori knowledge of the spectral degradation factors that might be determined. The computer system 630 then extracts an appropriate correction factor from the database 635 of correction factors to apply to the measured uncorrected windows ratio value(s). If the database 635 does not include an appropriate correction factor, then the measured uncorrected windows ratio value(s) may be ignored, or the computer system 630 may attempt to develop one, if so programmed. The database 635 may be stored on any kind of computer-readable, program storage medium, such as an optical disk 640, a, floppy disk 645, or a hard disk drive (not shown) of the computer system 630. The database 635 may also be stored on a separate computer system (not shown) that interfaces with the computer system 230.

Correcting the measured uncorrected windows ratio value (s) may be implemented differently in alternative embodiments. For instance, the computer system 630 may be programmed using some form of artificial intelligence to analyze the sensor outputs and controller inputs of the downhole tool 610 to develop an appropriate correction factor(s) on-the-fly in a real-time implementation. This approach might be a useful adjunct to the embodiment illustrated in FIG. 6, and discussed above, where there are measured uncorrected windows ratio value(s) for which the database 635 has no appropriate correction factor(s).

Some alternative embodiments may employ a form of feedback to improve the correction of measured uncorrected windows ratio value(s). The implementation of this feedback is dependent on several disparate facts, including the sensing capabilities of the downhole tool 610 and economics. One technique for doing this would be to monitor at least one effect of the implementation of the correction of measured uncorrected windows ratio value(s), and update the correction of measured uncorrected windows ratio value(s) based on the effect(s) monitored. The update may also depend on the correction of measured uncorrected windows ratio value(s). For instance, a linear correction of measured uncorrected windows ratio value(s) may require a different update than would a non-linear correction of measured uncorrected windows ratio value(s), all other factors being the same.

As is evident from the discussion above, some features of the present invention are implemented in software. For instance, the acts set forth in the boxes 520–530 in FIG. 5 are, in the illustrated embodiment, software-implemented, in whole or in part. Thus, some features of the present invention are implemented as instructions encoded on a computer-readable, program storage medium. The program storage medium may be of any type suitable to the particular implementation. However, the program storage medium will typically be magnetic, such as the floppy disk 645 or the computer 630 hard disk drive (not shown), or optical, such as the optical disk 640. When these instructions are executed by a computer, they perform the disclosed functions. The computer may be a desktop computer, such as the computer 630. However, the computer might alternatively be a processor embedded in the downhole tool 610. The computer might also be a laptop, a workstation, or a mainframe in various other embodiments. The scope of the invention is not limited by the type or nature of the program storage medium or computer with which embodiments of the invention might be implemented.

Thus, some portions of the detailed descriptions herein are, or may be, presented in terms of algorithms, functions, techniques, and/or processes. These terms enable those skilled in the art most effectively to convey the substance of their work to others skilled in the art. These terms are here, and are generally, conceived to be a self-consistent sequence of steps leading to a desired result. The steps are those requiring physical manipulations of physical quantities. Usually, though not necessarily, these quantities take the form of electromagnetic signals capable of being stored, transferred, combined, compared, and otherwise manipulated.

It has proven convenient at times, principally for reasons of common usage, to refer to these signals as bits, values, elements, symbols, characters, terms, numbers, and the like. All of these and similar terms are to be associated with the appropriate physical quantities and are merely convenient labels applied to these quantities and actions. Unless specifically stated otherwise, or as may be apparent from the discussion, terms such as "processing," "computing," "calculating," "determining," and the like, used herein refer to the action(s) and processes of a computer system, or similar electronic and/or mechanical computing device, that manipulates and transforms data, represented as physical (electromagnetic) quantities within the computer system's registers and/or memories, into other data similarly represented as physical quantities within the computer system's memories and/or registers and/or other such information storage, transmission and/or display devices.

Any of the above-disclosed embodiments of a method of correcting gamma ray data representations of gamma ray energies for spectral degradation according to the present invention enables a correction to be made for a windows ratio value (such as resolution-based windows COR values) bias(es) caused by environmental temperatures and/or intrinsic detector resolution differences from the database (characterization) tool. Compensation for temperature effects and inherent detector resolution is important in tertiary recovery projects, especially steam floods. In such field-wide projects, many (sometimes hundreds) of wells are logged annually and differences in the windows COR ratios are computed to indicate changes in oil-saturation from year to year. But, from year to year, steam can be turned on or off in individual producing intervals, so a "hot" zone logged one year may be "cold" the next, and vice-versa. Also, from one year to the next, the same logging tool may not necessarily be used to log the same well, and these tools may have different intrinsic detector resolutions.

In summary, if not properly compensated for, differences in resolution, either temperature-induced or intrinsic, can lead to incorrect interpretations of differences in time-lapse logs. In other words, unless properly compensated for, differences in time-lapse logs may not in fact be due to changes in oil-saturation but rather due to differences in formation/borehole temperature from one year to the next and/or due to differences in logs made with tools having different intrinsic resolutions.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such modifications, equivalents, and alternatives are considered within the scope of the invention as defined by the appended claims.

What is claimed:

1. A method of correcting gamma ray data representative of gamma ray energies for spectral degradation, comprising:
   a) degrading reference gamma ray spectra;
   b) calculating at least one correction factor between the degraded gamma ray spectra and the reference gamma ray spectra; and
   c) correcting the gamma ray data using at least one calculated correction factor.

2. The method of claim 1, wherein the gamma ray data is obtained with the use of a downhole tool disposed in a borehole formed in an earth formation, the tool including at least one gamma ray detector.

3. The method of claim 2, wherein the method is performed during or after drilling of the borehole.

4. The method of claim 1, wherein step (c) includes determining an amount of spectral degradation of the gamma ray data relative to the reference gamma ray spectra.

5. The method of claim 1, wherein step (c) includes applying a full-spectrum fitting technique to the gamma ray data.

6. The method of claim 1, wherein the reference gamma ray spectra are based on theoretical modeling and/or laboratory simulation.

7. The method of claim 6, wherein the theoretical modeling and/or laboratory simulation parameters include a temperature value.

8. The method of claim 1, wherein step (b) includes determining at least first and second windows within the degraded gamma ray spectrum.

9. The method of claim 8, wherein step (b) includes determining a first window value representative of the first window.

10. The method of claim 9, wherein step (b) includes determining a second window value representative of the second window.

11. The method of claim 10, wherein step (b) includes forming a first windows ratio value by dividing the first window value by the second window value.

12. The method of claim 11, wherein the first windows ratio value corresponds to at least one of a carbon-to-oxygen windows ratio value, a silicon-to-calcium windows ratio value, and a chlorine-to-hydrogen windows ratio value.

13. The method of claim 1, wherein step (c) includes determining at least first and second windows within a spectrum of the gamma ray data.

14. The method of claim 13, wherein step (c) includes determining a first window value representative of the first window of the gamma ray spectrum.

15. The method of claim 14, wherein step (c) includes determining a second window value representative of the second window of the gamma ray spectrum.

16. The method of claim 15, wherein step (c) includes forming a windows ratio value by dividing the first window value of the gamma ray spectrum by the second window value of the gamma ray spectrum.

17. The method of claim 16, wherein the windows ratio value corresponds to at least one of a carbon-to-oxygen windows ratio value, a silicon-to-calcium windows ratio value, and a chlorine-to-hydrogen windows ratio value.

18. The method of claim 16, wherein step (c) includes applying the at least one calculated correction factor to the windows ratio value.

19. A method of determining a correction factor for correcting data representative of gamma ray energies for spectral degradation, comprising:
   a) disposing a downhole tool in a simulated environment representative of actual downhole conditions, the tool including a neutron source and at least one gamma ray detector;
   b) varying the temperature of at least one gamma ray detector of the downhole tool;
   c) irradiating the simulated environment with neutrons emitted from the neutron source;
   d) detecting gamma ray energy signals at the at least one detector in response to gamma rays produced during nuclear reactions between the neutrons and materials in and of the simulated environment;
   e) determining a characteristic of the simulated environment;
   f) determining a characteristic of the at least one detector; and
   g) correlating the determined characteristic of the simulated environment with the determined characteristic of the at least one detector to determine at least one correction factor.

20. The method of claim 19, wherein step (e) includes determining a ratio of spectral representations of at least two constituents of the materials in and of the simulated environment.

21. The method of claim 19, wherein step (f) includes having an isotopic source near the at least one detector as the temperature of the at least one detector is varied.

22. The method of claim 19, wherein the at least one determined correction factor of step (g) is applied to gamma ray data representative of gamma ray energies obtained with a downhole tool disposed in a borehole formed in an earth formation.

23. A computer-readable, program storage device, encoded with instructions that, when executed by a computer, perform a method comprising:
   degrading reference gamma ray spectra;
   calculating at least one correction factor between the degraded gamma ray spectra and the reference gamma ray spectra; and
   correcting gamma ray data representative of gamma ray energies for spectral degradation using at least one calculated correction factor.

24. The computer-readable, program storage device of claim 23, wherein correcting the gamma ray data is based on a determined amount of spectral degradation of the gamma ray data relative to the reference gamma ray spectra.

25. The computer-readable, program storage device of claim 23, wherein the reference gamma ray spectra are based on theoretical modeling including a temperature parameter and/or laboratory simulation including a temperature parameter.

26. The computer-readable, program storage device of claim 23, wherein correcting the gamma ray data includes applying a full-spectrum fitting technique to the gamma ray data.

27. The computer-readable, program storage device of claim 23, wherein calculating the at least one correction factor includes determining at least first and second windows within the degraded gamma ray spectrum.

28. The computer-readable, program storage device of claim 27, wherein calculating the at least one correction factor includes determining a first window value representative of the first window and a second window value representative of the second window.

29. The computer-readable, program storage device of claim 28, wherein calculating the at least one correction factor includes forming a first windows ratio value by dividing the first window value by the second window value.

30. The computer-readable, program storage device of claim 23, wherein correcting the gamma ray data includes determining at least first and second windows within a spectrum of the gamma ray data.

31. The computer-readable, program storage device of claim 30, wherein correcting the gamma ray data includes determining a first window value representative of the first window of the gamma ray spectrum and a second window value representative of the second window of the gamma ray spectrum.

32. The computer-readable, program storage device of claim 31, wherein correcting the gamma ray data includes forming a windows ratio value by dividing the first window value of the gamma ray spectrum by the second window value of the gamma ray spectrum.

33. The computer-readable, program storage device of claim 32, wherein correcting the gamma ray data includes applying the at least one calculated correction factor to the windows ratio value.

34. A computer programmed to perform a method comprising:
   degrading reference gamma ray spectra;
   calculating at least one correction factor between the degraded gamma ray spectra and the reference gamma ray spectra; and
   correcting gamma ray data representative of gamma ray energies for spectral degradation using at least one calculated correction factor.

35. The computer of claim 34, wherein correcting the gamma ray data is based on a determined amount of spectral degradation of the gamma ray data relative to the reference gamma ray spectra.

36. The computer of claim 34, wherein the reference gamma ray spectra are based on theoretical modeling including a temperature parameter and/or laboratory simulation including a temperature parameter.

37. The computer of claim 34, wherein correcting the gamma ray data includes applying a full-spectrum fitting technique to the gamma ray data.

38. The computer of claim 34, wherein calculating the at least one correction factor includes determining at least first and second windows within the degraded gamma ray spectrum.

39. The computer of claim 38, wherein calculating the at least one correction factor includes determining a first window value representative of the first window and a second window value representative of the second window.

40. The computer of claim 39, wherein calculating the at least one correction factor includes forming a first windows ratio value by dividing the first window value by the second window value.

41. The computer of claim 34, wherein correcting the gamma ray data includes determining at least first and second windows within a spectrum of the gamma ray data.

42. The computer of claim 41, wherein correcting the gamma ray data includes determining a first window value representative of the first window of the obtained gamma ray spectrum and a second window value representative of the second window of the obtained gamma ray spectrum.

43. The computer of claim 42, wherein correcting the gamma ray data includes forming a windows ratio value by dividing the first window value of the obtained gamma ray spectrum by the second window value of the obtained gamma ray spectrum.

44. The computer of claim 43, wherein correcting the gamma ray data includes applying the at least one calculated correction factor to the windows ratio value.

* * * * *